US012165187B2

(12) United States Patent
Stoyanov

(10) Patent No.: US 12,165,187 B2
(45) Date of Patent: *Dec. 10, 2024

(54) SYSTEMS AND METHODS TO SUPPORT CUSTOM BUNDLING OF VIRTUAL ITEMS WITHIN AN ONLINE GAME

(71) Applicant: Mythical, Inc., Sherman Oaks, CA (US)

(72) Inventor: Stoyan Nikodimov Stoyanov, San Rafael, CA (US)

(73) Assignee: Mythical, Inc., Sherman Oaks, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 17/402,343

(22) Filed: Aug. 13, 2021

(65) Prior Publication Data

US 2022/0270150 A1    Aug. 25, 2022

Related U.S. Application Data

(63) Continuation of application No. 17/185,798, filed on Feb. 25, 2021, now Pat. No. 11,144,978.

(51) Int. Cl.
*G06Q 30/0601*    (2023.01)
*A63F 13/63*    (2014.01)
*G06F 16/27*    (2019.01)
*G06F 21/10*    (2013.01)

(52) U.S. Cl.
CPC ......... *G06Q 30/0621* (2013.01); *A63F 13/63* (2014.09); *G06F 16/27* (2019.01); *G06F 21/1014* (2023.08)

(58) Field of Classification Search
CPC ... G06Q 30/0621; A63F 13/63; A63F 13/352; A63F 13/792; G06F 16/27; G06F 21/1014
See application file for complete search history.

(56) References Cited

U.S. PATENT DOCUMENTS

| 9,508,222 | B1 | | 11/2016 | McLellan | |
|---|---|---|---|---|---|
| 9,717,986 | B1 | | 8/2017 | Kawaguchi | |
| 10,282,739 | B1 | | 5/2019 | Schultz | |
| 10,438,290 | B1 | * | 10/2019 | Winklevoss | ........ G06F 16/1815 |
| 10,984,400 | B1 | | 4/2021 | Koch | |
| 11,044,098 | B1 | * | 6/2021 | Thacker | ................ H04L 9/3073 |
| 11,062,284 | B1 | * | 7/2021 | Cunningham | .......... A63F 13/71 |
| 11,141,664 | B1 | * | 10/2021 | Koch | ..................... H04L 9/3236 |
| 11,144,978 | B1 | * | 10/2021 | Stoyanov | ................ A63F 13/63 |
| 11,179,640 | B1 | * | 11/2021 | Koch | ........................ A63F 13/73 |
| 11,288,735 | B1 | * | 3/2022 | Kao | ................... G06Q 30/0617 |
| 11,288,759 | B1 | * | 3/2022 | Linden | .................. A63F 13/847 |
| 11,484,796 | B1 | * | 11/2022 | Cunningham | .......... A63F 13/63 |

(Continued)

*Primary Examiner* — Aravind K Moorthy

(74) *Attorney, Agent, or Firm* — Esplin & Associates, PC

(57) ABSTRACT

Systems and methods to support custom bundling of virtual items within an online gaming platform are disclosed. Exemplary implementations may: facilitate entry and/or selection of virtual items that are owned by a first user; initiate bundling of the virtual items into a custom item bundle; create a digital asset that represents rights pertaining to the custom item bundle; record the digital asset of a decentralized ledger; transfer to rights to other users; distribute amounts of consideration to the user who owns particular rights pertaining to the custom item bundle.

20 Claims, 4 Drawing Sheets

(56) References Cited

U.S. PATENT DOCUMENTS

| | | | |
|---|---|---|---|
| 11,526,875 B1* | 12/2022 | Shetti | G06F 16/28 |
| 11,732,994 B1* | 8/2023 | Pasha | F41A 33/02 |
| | | | 463/51 |
| 2007/0129148 A1 | 6/2007 | Van Luchene | |
| 2010/0174593 A1 | 7/2010 | Cao | |
| 2011/0165939 A1 | 7/2011 | Borst | |
| 2011/0179268 A1 | 7/2011 | Strom | |
| 2012/0115605 A1 | 5/2012 | Watkins, Jr. | |
| 2012/0260346 A1 | 10/2012 | Carey | |
| 2012/0283014 A1 | 11/2012 | Van Luchene | |
| 2014/0029750 A1 | 1/2014 | Wei | |
| 2014/0342808 A1 | 11/2014 | Chowdhary | |
| 2015/0130836 A1 | 5/2015 | Anderson | |
| 2015/0335995 A1 | 11/2015 | McLellan | |
| 2015/0352436 A1 | 12/2015 | Pieron | |
| 2016/0158648 A1 | 6/2016 | Adamson | |
| 2016/0234302 A1 | 8/2016 | Wu | |
| 2016/0300234 A1 | 10/2016 | Moss-Pultz | |
| 2018/0143995 A1* | 5/2018 | Bailey | G06F 21/6218 |
| 2018/0216946 A1* | 8/2018 | Gueye | G01C 21/3617 |
| 2018/0234496 A1* | 8/2018 | Ratias | H04L 67/535 |
| 2018/0336601 A1 | 11/2018 | Tang | |
| 2018/0342106 A1 | 11/2018 | Rosado | |
| 2019/0028265 A1* | 1/2019 | Bisti | G06F 21/606 |
| 2019/0057115 A1* | 2/2019 | Liu | H04L 9/3247 |
| 2019/0098013 A1* | 3/2019 | Wilkinson | H04L 9/0825 |
| 2019/0118094 A1* | 4/2019 | McCoy | A63F 13/85 |
| 2019/0163912 A1* | 5/2019 | Kumar | H04L 9/0877 |
| 2019/0164136 A1* | 5/2019 | Gray | G06F 16/27 |
| 2019/0198144 A1* | 6/2019 | Blackley | G16H 50/20 |
| 2019/0208418 A1* | 7/2019 | Breu | H04L 9/3231 |
| 2019/0238488 A1 | 8/2019 | Peng | |
| 2019/0251575 A1* | 8/2019 | Berti | G06Q 30/018 |
| 2019/0251648 A1* | 8/2019 | Liu | G06F 16/27 |
| 2019/0266178 A1* | 8/2019 | Madhavan | G06Q 40/04 |
| 2019/0303807 A1* | 10/2019 | Gueye | G06F 16/9537 |
| 2019/0325044 A1* | 10/2019 | Gray | H04L 9/3239 |
| 2019/0354606 A1* | 11/2019 | Snow | G06Q 20/3678 |
| 2020/0005284 A1* | 1/2020 | Vijayan | H04L 9/3247 |
| 2020/0034457 A1* | 1/2020 | Brody | H04L 9/0819 |
| 2020/0034551 A1* | 1/2020 | Cantrell | H04L 9/3247 |
| 2020/0038761 A1* | 2/2020 | Packin | A63F 13/828 |
| 2020/0059363 A1* | 2/2020 | Lobo | G07G 3/00 |
| 2020/0145192 A1* | 5/2020 | Elkhiyaoui | H04L 9/0869 |
| 2020/0151817 A1* | 5/2020 | Mahfouz | G06F 16/27 |
| 2020/0160320 A1* | 5/2020 | Williams | G06Q 20/02 |
| 2020/0167459 A1* | 5/2020 | Viale | G06F 16/27 |
| 2020/0167741 A1* | 5/2020 | Gamaroff | G06Q 20/065 |
| 2020/0175001 A1 | 6/2020 | Malan | |
| 2020/0175623 A1* | 6/2020 | Howie | G06Q 50/18 |
| 2020/0202668 A1* | 6/2020 | Cotta | G07F 17/3244 |
| 2020/0211011 A1* | 7/2020 | Anderson | G06Q 20/3674 |
| 2020/0213127 A1* | 7/2020 | Maniyar | G06F 16/2379 |
| 2020/0220899 A1* | 7/2020 | Mathai | G06F 16/27 |
| 2020/0250176 A1 | 8/2020 | Padmanabhan | |
| 2020/0266985 A1* | 8/2020 | Covaci | G06F 8/44 |
| 2020/0267020 A1* | 8/2020 | Doney | G06F 16/9024 |
| 2020/0320491 A1 | 10/2020 | Hilmola | |
| 2020/0328891 A1* | 10/2020 | Drouot | H04L 9/0637 |
| 2020/0380090 A1* | 12/2020 | Marion | G06F 21/602 |
| 2021/0011776 A1 | 1/2021 | Thirumalai | |
| 2021/0056630 A1* | 2/2021 | Rechtschaffen | H04L 9/3239 |
| 2021/0073913 A1* | 3/2021 | Ingargiola | H04L 67/104 |
| 2021/0097610 A1 | 4/2021 | Grube | |
| 2021/0117938 A1* | 4/2021 | Arora | G06Q 20/3827 |
| 2021/0166247 A1* | 6/2021 | Sirigiri | G06F 16/27 |
| 2021/0233075 A1* | 7/2021 | Shaevel | G06Q 20/385 |
| 2021/0352134 A1* | 11/2021 | Bjontegard | H04W 12/009 |
| 2022/0118365 A1* | 4/2022 | Thacker | A63F 13/71 |
| 2022/0410017 A1* | 12/2022 | Davies | A63F 13/73 |

* cited by examiner

SYSTEMS AND METHODS TO SUPPORT CUSTOM BUNDLING OF VIRTUAL ITEMS WITHIN AN ONLINE GAME

FIELD OF THE DISCLOSURE

The present disclosure relates to systems and methods to support custom bundling of virtual items within an online gaming platform.

BACKGROUND

Online gaming platforms are known. Users of online gaming platforms exchanging digital in-game assets with other users is known. Distributed ledgers are known techniques to produce a secure record or registry of ownership of assets, transactions, and other information. For example, a distributed blockchain is a distributed ledger.

SUMMARY

One aspect of the present disclosure relates to a system configured to support custom bundling of virtual items within a game and/or an online gaming platform. The system includes one or more processors configured by machine-readable instructions. The one or more processors may be configured to execute, within the online gaming platform, an instance of a game to facilitate presentation of the game to users, and implement in-game actions in the instance of the game in response to action requests for the in-game actions by the users. The presentation of the game is based on views of the game that are determined during execution of the instance of the game. The users include at least a first user, a second user, and a third user that interact with the instance of the game. The one or more processors may be configured to facilitate entry and/or selection, by the first user, of two or more virtual items that are owned by the first user. The two or more virtual items are usable within the instance of the game. The one or more processors may be configured to initiate bundling, by the first user, of the two of more virtual items into a custom item bundle such that subsequently, the custom item bundle includes the two or more virtual items. The one or more processors may be configured to responsive to the bundling of the two or more virtual items into the custom item bundle, create a digital asset that represents a set of rights pertaining to the custom item bundle. The digital asset is associated with each of the two of more virtual items. The set of rights includes ownership rights pertaining to the custom item bundle and distribution rights pertaining to the custom item bundle. The one or more processors may be configured to record, on a decentralized ledger implemented by a decentralized ledger server, one or more transactions that reflect the ownership rights pertaining to the custom item bundle as being owned by the first user, and the distribution rights pertaining to the custom item bundle as being owned by the first user. The one or more processors may be configured to transfer the ownership rights pertaining to the custom item bundle to the second user in exchange for a first amount of consideration. The one or more processors may be configured to distribute a first portion of the first amount of consideration to whichever user owns the distribution rights of the custom item bundle. The one or more processors may be configured to transfer the ownership rights pertaining to the custom item bundle from the second user to a third user in exchange for a second amount of consideration. The one or more processors may be configured to distribute a second portion of the second amount of consideration to whichever user owns the distribution rights of the custom item bundle.

Another aspect of the present disclosure relates to a method to support custom bundling of virtual items within a game and/or an online gaming platform. The method may include executing, within the online gaming platform, an instance of a game to facilitate presentation of the game to users, and implementing in-game actions in the instance of the game in response to action requests for the in-game actions by the users. The presentation of the game is based on views of the game that are determined during execution of the instance of the game. The users include at least a first user, a second user, and a third user that interact with the instance of the game. The method may include facilitating entry and/or selection, by the first user, of two or more virtual items that are owned by the first user. The two or more virtual items are usable within the instance of the game. The method may include initiating bundling, by the first user, of the two of more virtual items into a custom item bundle such that subsequently, the custom item bundle includes the two or more virtual items. The method may include, responsive to the bundling of the two or more virtual items into the custom item bundle, creating a digital asset that represents a set of rights pertaining to the custom item bundle. The digital asset is associated with each of the two of more virtual items. The set of rights includes ownership rights pertaining to the custom item bundle, and distribution rights pertaining to the custom item bundle. The method may include recording, on a decentralized ledger implemented by a decentralized ledger server, one or more transactions that reflect the ownership rights pertaining to the custom item bundle as being owned by the first user, and the distribution rights pertaining to the custom item bundle as being owned by the first user. The method may include transferring the ownership rights pertaining to the custom item bundle to the second user in exchange for a first amount of consideration. The method may include distributing a first portion of the first amount of consideration to whichever user owns the distribution rights of the custom item bundle. The method may include transferring the ownership rights pertaining to the custom item bundle from the second user to the third user in exchange for a second amount of consideration. The method may include distributing a second portion of the second amount of consideration to whichever user owns the distribution rights of the custom item bundle.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
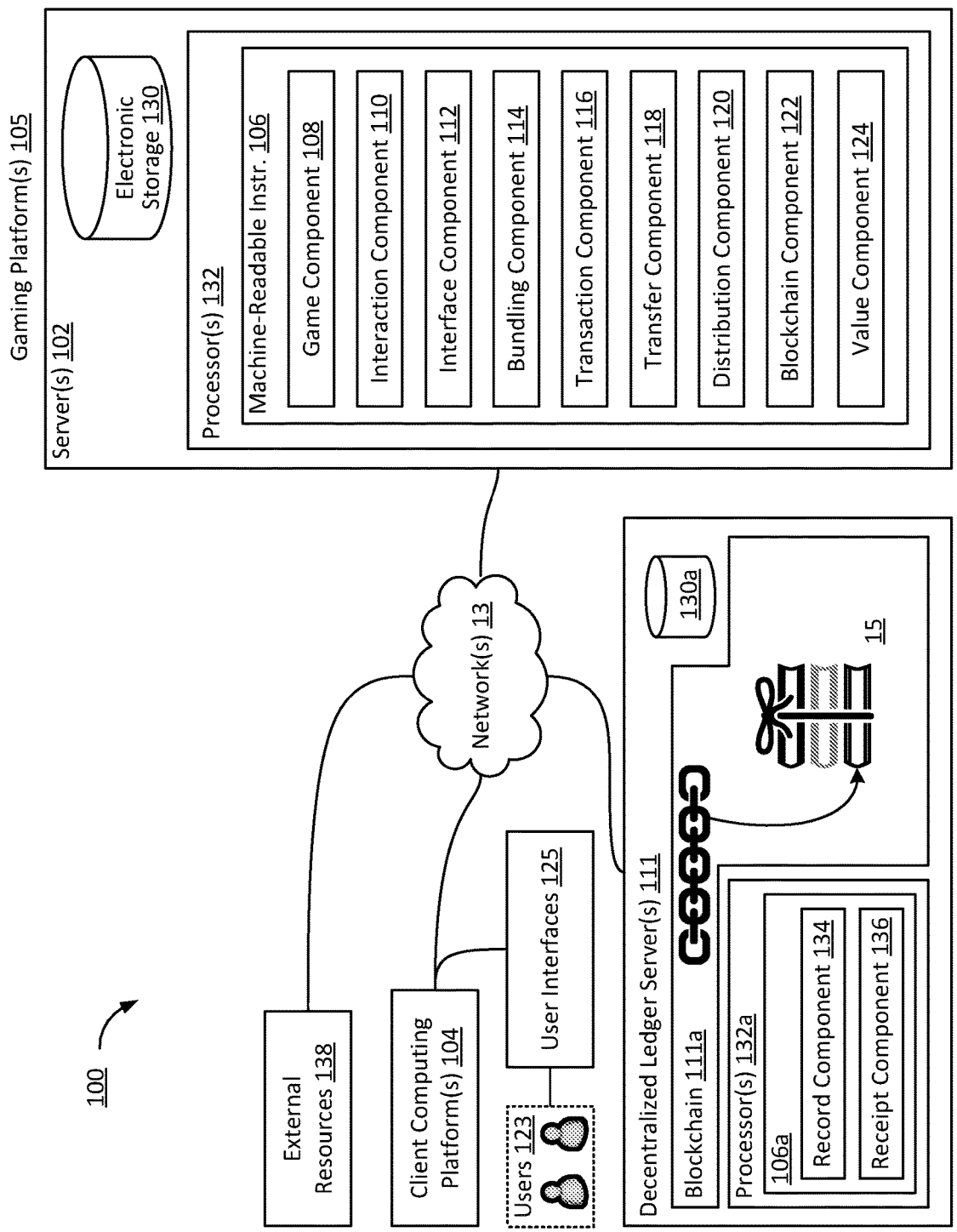
FIG. 1 illustrates a system configured to support custom bundling of virtual items within an online gaming platform, in accordance with one or more implementations.

FIG. 1 illustrates a system 100 configured to support custom bundling of virtual items within a game and/or an online gaming platform, in accordance with one or more implementations. System 100 may include one or more online gaming platforms 105, server(s) 102, electronic storage 130, user interface(s) 125, decentralized ledger server(s) 111, client computing platform(s) 104, external resources 138, and/or other components. Users 123 (also referred to as players) may include one or more of a first user, a second user, a third user, a fourth user, and/or other users. As used in descriptions herein, any use of the term "user" may refer to user(s) 123. Electronic storage 130a may be similar to electronic storage 130 as described elsewhere in this disclosure, though included in decentralized ledger servers 111. Processor(s) 132a may be similar to processor(s) 132 as described elsewhere in this disclosure, though included in decentralized ledger servers 111. Machine instructions 106a may be similar to machine instructions 106 as described elsewhere in this disclosure, though included in decentralized ledger servers 111.

Instances of online games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital assets (e.g., characters, weapons, resources, etc.) to users 123 of online gaming platform 105. In some implementations, individual players may own individual virtual items, and exchange these items with other individual players. Due to an exchange, ownership rights (and/or other rights) of an in-game digital asset ("digital asset" for short) may transition from an original owner to a new owner (even if there may, in some implementations, be one or more intermediary and/or temporary owners during the process of performing the exchange). In some implementations, digital assets may be associated with other rights than ownership rights, such as, by way of non-limiting example, distribution rights.

In some implementations, distribution rights of digital assets may reflect rights held by the individual ones of the users to receive certain distributions of benefits upon certain events within the game, including but not limited to the occurrences of exchanges involving particular digital assets. That is, the individual users may own/hold rights to particular digital assets that guarantee them benefits upon (future) events and/or exchanges involving those digital assets regardless of whether the individual users own/hold the ownership rights for those digital assets. In some implementations, the distribution gains may result from a particular action or activity (such as, e.g., the use or sale of a particular digital asset), e.g., within the online gaming platform 105, of a particular digital asset. As used herein, a distribution triggered by a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the users that hold or own the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital assets.

In some implementations, the digital assets may include and/or be virtual items that are not fungible and may be usable within an online gaming platform 105. In some implementations, the digital assets may represent three-dimensional in-game user-controllable characters that can interact with other (in-game) virtual items within online gaming platform 105. By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual CryptoKitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, digital assets may be usable within one or more games.

Online gaming platform(s) 105 may include server(s) 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 and/or decentralized ledger server(s) 111 may be configured to communicate with one or more of online gaming platform(s) 105, users 123, and/or other entities and/or components. Users 123 may include players who play and/or otherwise interact on online gaming platform 105.

Server(s) 102 may include electronic storage 130, processor(s) 132, machine-readable instructions 106, and/or other components. Processor(s) 132a may be similar to processor(s) 132 as described elsewhere in this disclosure, though included in decentralized ledger servers 111. Machine-readable instructions 106a may be similar to machine-readable instructions 106 as described elsewhere in this disclosure, though included in decentralized ledger servers 111. Server(s) 102 may be configured by machine-readable instructions 106. Machine-readable instructions 106 may include one or more instruction components. The instruction components may include computer program components. The instruction components may include one or more of a game component 108, an interaction component 110, an interface component 112, a bundling component 114, a transaction component 116, a transfer component 118, a distribution component 120, a blockchain component 122, a value component 124, a record component 134, a receipt component 136, and/or other instruction components.

Decentralized ledger server(s) 111 may include one or more of electronic storage 130a, processor(s) 132a, machine-readable instructions 106a, a blockchain 111a, and/or other components. Machine-readable instructions 106a may include one or more instruction components. The instruction components may include computer program components. The instruction components may include one or more of record component 134, receipt component 136, and/or other instruction components. As depicted in FIG. 1, blockchain 111a may include a custom item bundle 15 (by way of non-limiting example, ownership rights to custom item bundle 15 may be recorded on blockchain 111a).

In some implementations, blockchain 111a may be maintained by a distributed computing platform (not shown in FIG. 1). In some implementations, the distributed computing platform may be implemented by a set of client computing platforms and/or servers (including, for example, one or more decentralized ledger servers 111). The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 111a. The smart contracts may be stored on blockchain 111a. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Elements of blockchain 111a may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain 111a may be publicly accessible and append-only. In some implementations, existing blocks of blockchain 111a can substantially not be altered or deleted, unless multiple copies are altered. This is unlikely to happen provided that the multiple copies stored on different computing platforms, e.g., in different geographical locations. Blockchain 111a may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

In some implementations, game component 108 may be configured to execute, via online gaming platform 105, an instance of a game. The instance of the game may facilitate presentation of the game to users 123. For example, the instance of the game may be an online game executed with online gaming platform 105. Game component 108 may be configured to implement in-game actions in the instance of the game, e.g., in response to action requests for the in-game actions by the users. In some implementations, game component 108 may be arranged, organized, and/or otherwise included in online gaming platform 105. As used herein, the term "game" may refer to one or more games within gaming platform 105. In some implementations, the game may be provided via a virtual space, and may include a plurality of resource types and/or maps.

The presentation of the game may be based on the views of the game that are determined during execution of the game. In some implementations, the view may be communicated (e.g., by streaming, via object/position data, and/or other information) from decentralized ledger server(s) 111 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). In some implementations, user-controlled characters may be capable of locomotion within the topography of the simulated space that is included in the instance of the game. In some implementations, user-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. By way of non-limiting illustration, users 123 may include the first user and the second user that interact with online gaming platform 105. The first user and the second user may control digital assets (e.g., characters) in a game hosted by online gaming platform 105. In some implementations, user inventories may be managed using blockchain 111a. For example, ownership rights (and/or other types of rights) of individual virtual items included in an individual user inventory may be recorded on blockchain 111a. In some implementations, individual user inventories may correspond to individual smart contracts stored on blockchain 111a.

Interaction component 110 may be configured to enable, facilitate, and/or implement in-game actions by users 123 in instances of games. In some implementations, interaction component 110 may be configured to operate in response to instructions and/or action requests by users 123. For example, one or more users may interact within gaming platform 105 to build, create, gather, find, combine, and/or otherwise generate content (i.e., user-generated content). In some implementations, operations may be accomplished by interaction component 110 through user interfaces 125. Isi particular, operations pertaining to a particular user may be accomplished through a particular user interface of a particular client computing platform 104, where the particular client computing platform 104 is associated with the particular user.

Interface component 124 may be configured to facilitate interaction of users 123 with system 100. In some implementations, interface component may be configured to facilitate interaction by users 123 through user interfaces 125. For example, a particular user may be associated with a particular client computing platform 104, which may include a particular user interface 125. In some implementations, interface component 124 may be configured to facilitate entry and/or selection of virtual items for bundling through one or more user interfaces 125. The virtual items may be usable within a particular instance of a particular game. In some implementations, interface component 124 may be configured to initiate bundling of virtual items (e.g., as previously selected) through one or more user interfaces 125. In some implementations, interface component 124 may facilitate entry and/or selection of two or more virtual items. In some implementations, interface component 124 may facilitate entry and/or selection of three or more virtual items. In some implementations, interface component 124 may facilitate entry and/or selection through (presentation of) one or more user interfaces 125 (such as, by way of non-limiting example, a bundling interface).

Figure 4:
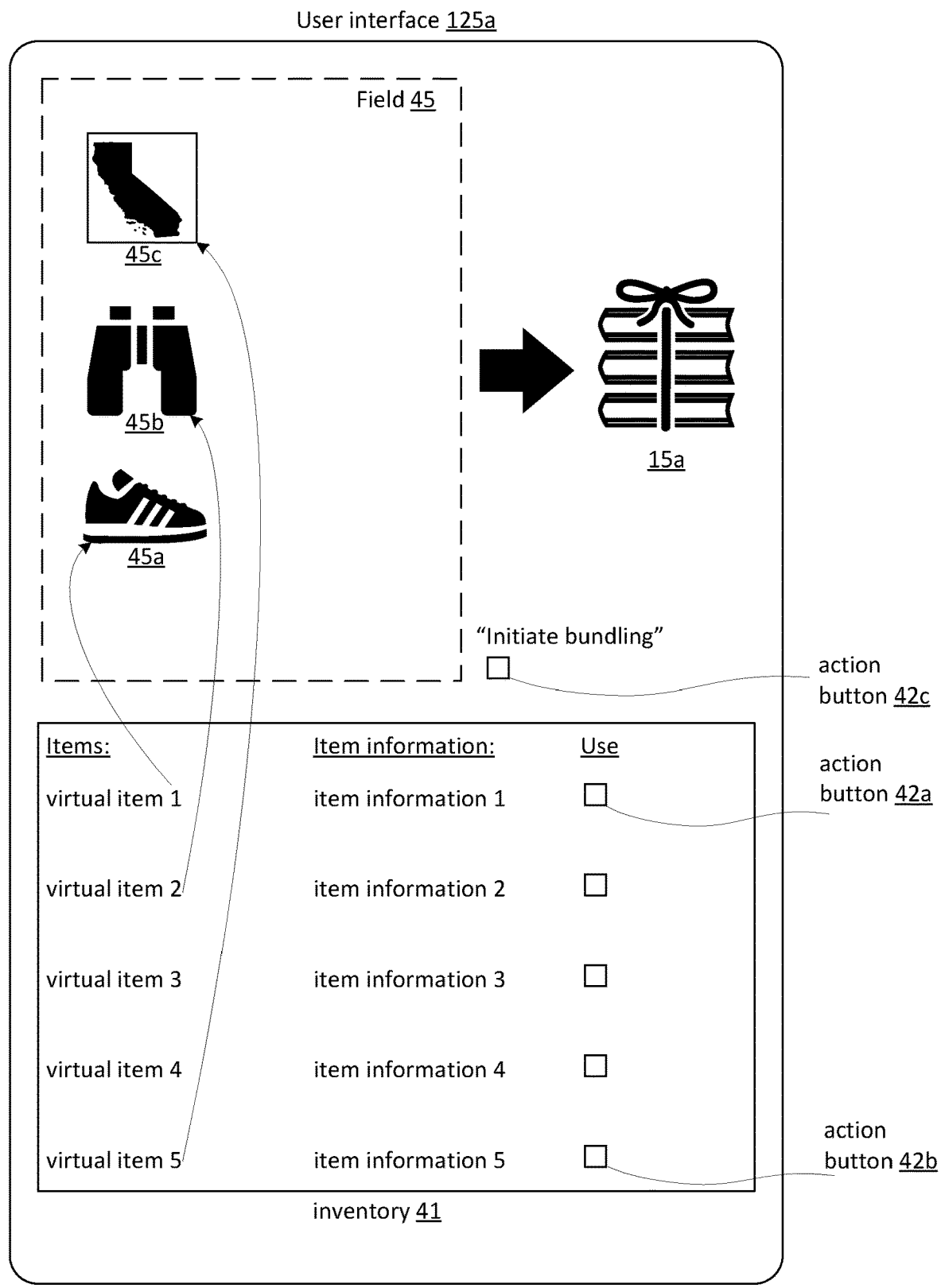
FIG. 4 illustrates an example implementation of a bundling interface, as may be used by a system configured to support custom bundling of virtual items within an online gaming platform, in accordance with one or more implementations.

By way of non-limiting example, FIG. 4 illustrates a user interface 125a (i.e., a bundling interface), depicting a user inventory 41, as may be used in system 100. As depicted, user inventory 41 may include a list of different virtual items and/or assets currently owned by a particular user, including virtual items 1-2-3-4-5. User interface 125a further depicts item information regarding these virtual items, as indicated by item information 1-2-3-4-5, which correspond to virtual items 1-2-3-4-5, respectively. For example, "virtual item 1" may be a pair of shoes 45a, "virtual item 2" may be a pair of binoculars 45b, and "virtual item 5" may be a map 45c, as depicted in FIG. 4. User interface 125a may further include graphical user interface elements such as, by way of non-limiting example, action buttons 42a, 42b, 42c. Upon engagement by a user, action button 42a may initiate a process to use "virtual item 1". Likewise, upon engagement by a user, action button 42b may initiate a different process to use "virtual item 5". User interface 125a may include a field 45 used for bundling multiple virtual items into custom item bundle 15a. For example, the user may drag items from inventory 41 into field 45. As depicted, the user has moved "virtual item 1", "virtual item 2", and "virtual item 5" into field 45. Upon engagement by a user, action button 42c (labeled "Initiate bundling") may initiate the bundling of the virtual items in field 45 into custom item bundle 15a. Upon creation (and/or recordation) of this custom item bundle 15a, certain value may be unlocked in the instance of the game. As an example of unlocked value, the owner of this custom item bundle may obtain improved and/or increased skill as an explorer, e.g., by virtue of synergistic effects between the items of these shoes, binoculars, and this map. Other potentially useful additions might a shovel, a flashlight, etc.

As another example, a custom item bundle that includes a water bottle, protein powder, and dumbbells may unlock value for a game character related to (improved) working out. As another example, a custom item bundle that includes a lab coat, a clipboard, and a microscope may unlock value in the game related to (increased levels of) science and/or innovation. As another example, a custom item bundle that includes a red stapler, a hilarious coffee mug, and a messenger bag may unlock in-game value related to (increased levels of) office success and/or productivity. As another example, a custom item bundle that includes a pair of jorts, at least two articles of clothing that depict an energy drink logo, and a regrettable tattoo may unlock abilities related to (increased occurrences of) being offered a variety of clandestine goods and/or services within the game. In some implementations, a custom item bundle may include virtual items from different games (i.e., a first virtual item from a first game, a second virtual item from a second game, etc.). For example, the unlocked value may pertain to the first game, the second game, or both games.

Bundling component 114 may be configured to bundle virtual items into custom item bundles. In some implementations, bundling component 114 may be configured to initiate bundling of virtual items into custom item bundles. For example, a custom item bundle may include multiple virtual items. In some implementations, a custom item bundle may include and/or represent certain rights pertaining to the virtual items that are included. For example, a particular custom item bundle may include ownership rights of the virtual items that are included, such that exchanging the particular custom item bundle to another user implies that the included virtual items are also exchanged. For example, a given custom item bundle may include distribution rights pertaining to the virtual items that are included, such that exchanging the given custom item bundle to another user implies that the distribution rights for the included virtual items are also exchanged. In some implementations, a custom item bundle may be entirely separate from the included items such that exchanging the bundle does not affect rights pertaining to the included virtual items, and vice versa.

Bundling component 114 may be configured to create and/or generate digital assets, tokens, and/or other virtual items. By way of non-limiting example, operations by bundling component 114 may be performed responsive to the bundling of virtual items into a custom item bundle. In some implementations, a created and/or generated digital asset may represent one or more rights pertaining to a custom item bundle. In some implementations, a created and/or generated token may represent one or more rights pertaining to a custom item bundle. In some implementations, a created and/or generated virtual item may represent one or more rights pertaining to a custom item bundle. For example, the represented rights may include one or more of ownership rights, distribution rights, and/or other rights pertaining to the custom item bundle. In some implementations, bundling component 114 may be configured to perform tokenization of custom item bundles and/or their included virtual items.

Transaction component 116 may be configured to generate and/or record transactions on a decentralized ledger (e.g., blockchain 111a) implemented by one or more decentralized ledger servers (e.g., decentralized ledger server 111). In some implementations, one or more transactions may reflect that particular rights (e.g., ownership rights, distribution rights, and/or other rights) pertaining to a particular virtual item (e.g., a custom item bundle, a digital asset, a token, and/or another virtual item) are owned by particular users. In some implementations, transaction component 116 may be configured to generate (sets of) instructions that, upon execution by the decentralized ledger (e.g., blockchain 111a), assign particular rights to particular users. In some implementations, transaction component 116 may be configured to generate (sets of) instructions that, upon execution by the decentralized ledger (e.g., blockchain 111a), modify particular rights that are recorded on the decentralized ledger.

Transfer component 118 may be configured to transfer particular rights (e.g., as pertaining to a custom item bundle) from one user to another user (e.g., as part of an exchange between users). For example, transfer component 118 may transfer ownership rights. For example, transfer component 118 may transfer distribution rights. In some implementations, transfer component 118 may be configured to generate (sets of) instructions that, upon execution by the decentralized ledger (e.g., blockchain 111a), effectuate a transfer of particular rights. In some implementations, transfer component 118 may be configured to generate (sets of) instructions that, upon execution by the decentralized ledger (e.g., blockchain 111a), effectuate a particular assignment of the particular rights that are recorded on the decentralized ledger.

Distribution component 120 may be configured to determine distributions (e.g., portions of certain amounts of consideration and/or other benefits) in accordance with distribution rights. Distribution component 120 may be configured to distribute these determined portions to the users who own those distribution rights. For example, assume that a first user exchanges a particular custom item bundle to a second user for 100 coins. Assume the distribution rights amount to 5% of these types of exchanges. Accordingly, whichever user owns the distribution rights to the particular custom item bundle will receive a distribution of 5% of these 100 coins (or, 5 coins). Note that ownership rights and distribution rights may be exchanged independently of each other. For example, assume the second user exchanges the particular custom item bundle to a third user for 200 coins. Accordingly, whichever user owns the distribution rights to the particular custom item bundle will receive a distribution of 5% of these 200 coins (or, 10 coins). This may still be the same user who received the first distribution of 5 coins. In some implementations, this user could be the first user, the second user, the third user, and/or a different user (neither the first, second, nor third user). In some implementations, distributions may be triggered by other events in the game than exchanges of digital assets between users. For example, certain types of use of a digital asset may provide and/or otherwise effectuate some benefit to the owner of the digital asset. In some cases, the owner of the distribution rights may be entitled to a portion of such a benefit. In some implementations, distribution component 120 may be configured such that distributions are provided by one or more smart contracts recorded on blockchain 111a.

Blockchain component 122 may be configured to generate instructions for execution by a decentralized ledger (e.g., blockchain 111a). In some implementations, blockchain component 122 may provide an abstraction layer (for blockchain 111a) and/or application programming interface (API) (for blockchain 111a) to users and/or other components of system 100. For example, an instruction or function call to blockchain component 122 may be converted, translated, and/or otherwise processed into a set of instructions that are executable by the decentralized ledger (e.g., blockchain 111a).

In some implementations, blockchain component 122 may be configured to generate instructions to form digital assets (e.g., as created by bundling component 114) as smart contracts. Blockchain component 122 may transfer these instructions to decentralized ledger server 111 and/or blockchain 111a for execution and/or recording.

Value component 124 may be configured to unlock value within the instance of the game responsive to the bundling of virtual items into a custom item bundle. In some implementations, value component 124 may be configured to unlock value within the instance of the game responsive to the creation of a digital assets that represents rights pertaining to a custom item bundle. In some implementations, value component 124 may be configured to unlock value within the instance of the game responsive to the recording of rights (e.g., on blockchain 111a) pertaining to a custom item bundle. In some implementations, unlocked value may be a reward (e.g., a virtual item or a skill or a progress level) provided by the game to a particular user. In some implementations, unlocked value may be a particular status (e.g., as indicated by a badge) provided by the game to a particular user. In some implementations, unlocked value may be access to in-game content (e.g., a new level or mission) provided by the game to a particular user. In some implementations, unlocked value may increase the power, skill or ability of the particular user (or a character controlled by the particular user). In some implementations, unlocked value may be reverted and/or otherwise undone upon the loss or destruction of the custom item bundle. In some implementations, unlocked value may persist upon the loss or destruction of the custom item bundle.

Receipt component 136 may be configured to receive (sets of) instructions to add, modify, and/or remove recorded rights in blockchain 111a. For example, instruction component 136 may receive one or more sets of instructions from transfer component 118, gaming platform 105, and/or other components of system 100. Receipt component 136 may provide received sets of instructions to record component 134 for execution. In some implementations, execution of individual ones of the instructions received to modify recorded rights may include invoking one or more function calls of an Application Programming Interface (API). For example, the API may be configured to provide interactive communication between blockchain 111a and other components of system 100. For example, in some implementations, API function calls may be implemented as function calls to smart contracts stored on blockchain 111a. In some implementations, receipt component 136 may be arranged, organized, and/or otherwise included in decentralized ledger server 111 and/or blockchain 111a.

Record component 134 may be configured to record (ownership) rights pertaining to digital assets, e.g., on blockchain 111a. In some implementations, record component 134 may record rights on electronic storage 130a. In some implementations, record component 134 may record rights on blockchain 111a. The rights may include ownership rights, distribution rights, and/or other rights. For example, particular recorded rights may reflect ownership of a particular digital asset by a particular user or group of users. For example, the particular digital asset may be not fungible, and may represent a three-dimensional in-game user-controllable item or character that can interact with other virtual items within gaming platform 105. Recorded rights may be asset-specific. For example, distribution rights for a particular digital asset may designate rights to certain distributions of benefits upon an exchange involving the particular digital asset.

In some implementations, record component 134 may be configured to record rights in blockchain 111a. In some implementations, record component 134 may add, modify, and/or remove recorded rights. For example, in accordance with received instructions from instruction component 136, record component 134 may transfer ownership of a particular digital asset from a first owner to a second owner (e.g., from an original owner to a new owner) such that the recorded rights on blockchain 111a no longer reflect the ownership of the particular digital asset by the first user. In some implementations, in accordance with received instructions, record component 134 may transfer ownership of a particular digital asset temporarily, e.g., from a first owner to a temporary second owner. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, record component 134 may transfer ownership of a particular digital asset non-temporarily from a first owner to a second owner, e.g., when a particular exchange is not reversible or no longer reversible. In some implementations, record component 134 may be arranged, organized, and/or otherwise included in blockchain 111a.

In some implementations, record component 134 may be configured to obtain asset-specific rights (e.g., ownership rights, distribution rights, and/or other rights) for particular digital assets. In some implementations, record component 134 may be configured to access blockchain 111a to obtain the asset-specific rights (that are recorded on blockchain 111a, e.g., in one or more smart contracts).

Figure 3A:
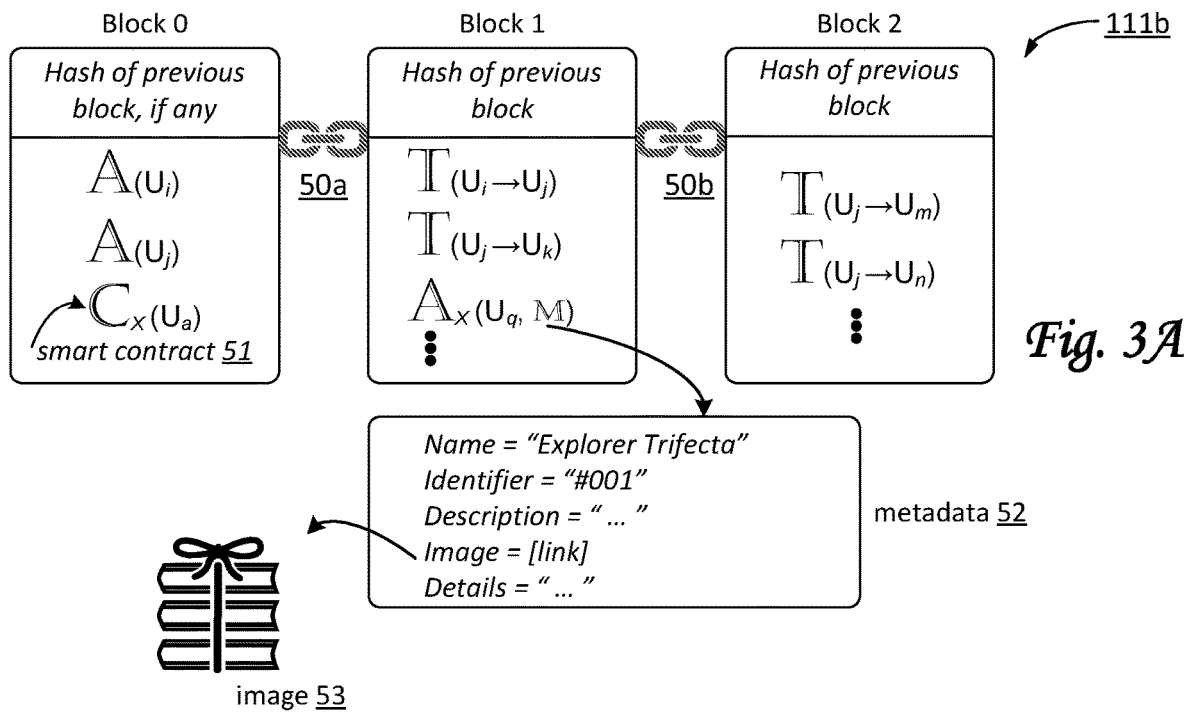
FIGS. 3A-3B illustrate blockchains, as may be used by a system configured to support custom bundling of virtual items within an online gaming platform, in accordance with one or more implementations.

By way of non-limiting example, FIG. 3A illustrates a blockchain 111b that implements a blockchain including a block 0, a block 1, and a block 2. As time progresses, more blocks may be added to blockchain 111b. The blocks within blockchain 111b are ordered. As shown in block 0, two assets (indicated by a capital "A") are created and/or generated, and subsequently assigned to two users or players: a first asset is assigned to user i (Ui), a second asset is assigned to user j (Uj), and a third asset, a smart contract 51 indicated by a capital "C", is assigned to user "a" (Ua, e.g., an administrative user). As used in the context of blockchains, assignments may be recordations of ownership (also referred to as recordings of ownership). These assets may be individually manifested, deployed, and/or instantiated on blockchain 111b. Block 1 is connected to block 0 (as indicated by a link 50a), for example, by including an address of block 1 in block 0, or vice versa. Likewise, block 1 is connected to block 2, as indicated by a link 50b.

In block 1, one asset (labeled Ax) is assigned to user q (Uq), for example by associating an account address of user q to asset Ax. For example, asset Ax may be created through a function of smart contract 51. Asset Ax may represent ownership rights of a particular custom item bundle (e.g., a bundle referred to as the "Explorer Trifecta") as indicated by metadata 52 (e.g., storing information including recorded rights pertaining to this custom item bundle) and depicted by image 53. For example, this particular custom item bundle may be similar to custom item bundle 15a (in FIG. 4). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111b may determine the current assets of blockchain 111b, the balances of any user, and the current owners of any asset. In some implementations, the balance of a particular user may be verified prior to adding a transaction that reduces that particular user's balance. For example, an individual user may not be allowed to transfer assets the individual user does not own.

Figure 3B:
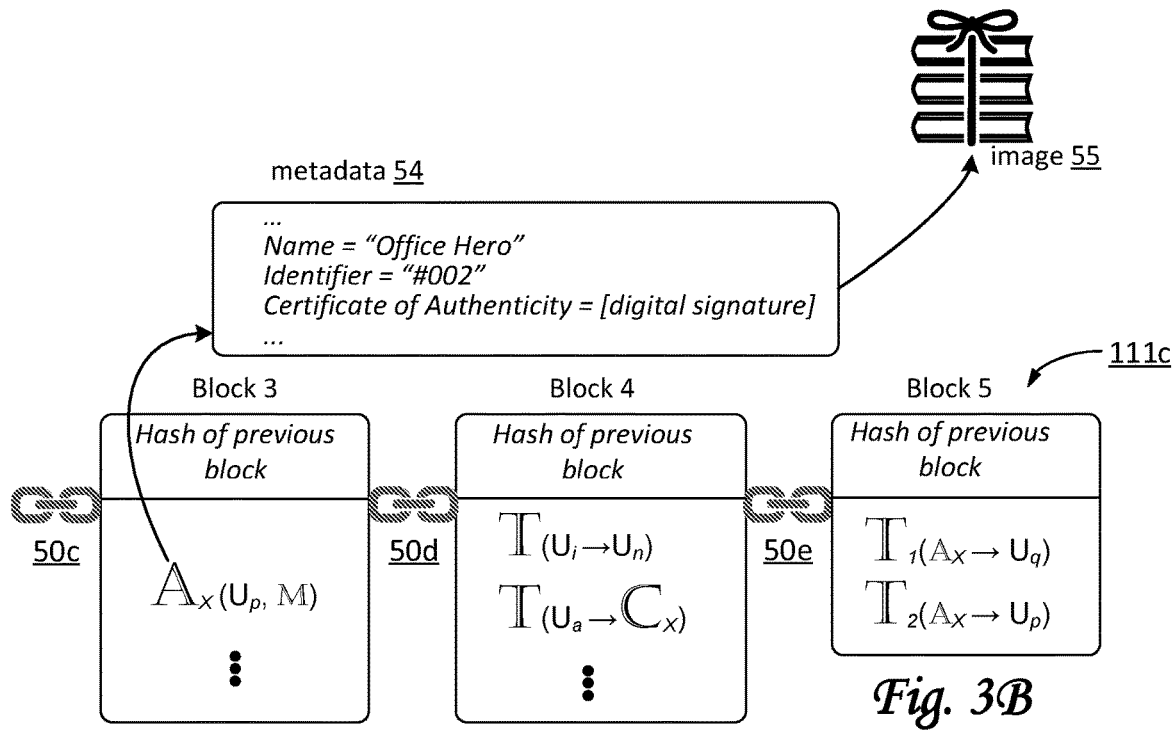

By way of non-limiting example, FIG. 3B illustrates a blockchain 111c that includes the same blocks as blockchain 111b of FIG. 3A, plus additional blocks (block 3, block 4, block 5) that have been appended to the blockchain. Block 3 may be connected to block 2 (as indicated by a link 50c), block 4 may be connected to block 3 (as indicated by a link 50d), and block 5 may be connected to block 4 (as indicated by a link 50e). In block 3, an asset (labeled Ax) is assigned to user p (Up), for example by associating an account address of user p to this particular asset $A_x$. For example, this particular asset Ax may be created through another call of a function of smart contract 51. For example, this asset Ax may represent ownership rights of a different custom item bundle (e.g., a bundle referred to as the "Office Hero", which includes a red stapler, a hilarious coffee mug, and a messenger bag) as indicated by metadata 54 (e.g., storing information including recorded rights pertaining to this particular custom item bundle) and depicted by image 55.

In FIG. 5B, a function call to a particular function defined by smart contract 51 (e.g., to initiate a particular distribution related to asset Ax) may be depicted and/or implemented as a transaction (e.g., the function may be invoked in exchange for consideration). In some implementations, smart contract 51 may have been posted to blockchain 111b by an administrative user. Block 4 includes a transaction (indicated by a capital "T") from user i to user n. For example, the transaction may represent a purchase of a first virtual item by user n. Additionally, block 4 includes a transaction from user "a" to the same smart contract as depicted in block 0. For example, the transaction may represent user "a" initiating one or more particular distributions to (the owners of) particular assets Ax. By way of non-limiting example, perhaps these particular assets Ax were involved in some type of usage within the game or in some type of exchange that triggered its distribution rights. Block 5 includes a first transaction T1 representing a transfer of a distribution from the first asset Ax (of block 1) to the current owner of this asset Ax (this custom item bundle); here this owner is user q. Additionally, block 5 includes a second transaction T2 representing a transfer of a distribution from the second asset Ax (of block 3) to the current owner of this asset Ax (this custom item bundle); here this owner is user p.

Referring to FIG. 1, in some implementations, server(s) 102, client computing platform(s) 104, and/or external resources 138 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, external providers of computation and/or storage services, and/or other resources. In some implementations, some or all of the functionality attributed herein to external resources 138 may be provided by resources included in system 100.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor (s) 132 may be configured to execute components 108, 110, 112, 114, 116, 118, 120, 122, 124, 134, and/or 136, and/or other components. Processor(s) 132 may be configured to execute components 108, 110, 112, 114, 116, 118, 120, 122, 124, 134, and/or 136, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 134, and/or 136 are illustrated in FIG. 1 as being implemented within a single processing unit, in implementations in which processor(s) 132 includes multiple processing units, one or more of components 108, 110, 112, 114, 116, 118, 120, 122, 124, 134, and/or 136 may be implemented remotely from the other components. The description of the functionality provided by the different components 108, 110, 112, 114, 116, 118, 120, 122, 124, 134, and/or 136 described below is for illustrative purposes, and is not intended to be limiting, as any of components 108, 110, 112, 114, 116, 118, 120, 122, 124, 134, and/or 136 may provide more or less functionality than is described. For example, one or more of components 108, 110, 112, 114, 116, 118, 120, 122, 124, 134, and/or 136 may be eliminated, and some or all of its functionality may be provided by other ones of components 108, 110, 112, 114, 116, 118, 120, 122, 124, 134, and/or 136. As another example, processor(s) 132 may be configured to execute one or more additional components that may perform some or all of the functionality attributed below to one of components 108, 110, 112, 114, 116, 118, 120, 122, 124, 134, and/or 136.

Figure 2:
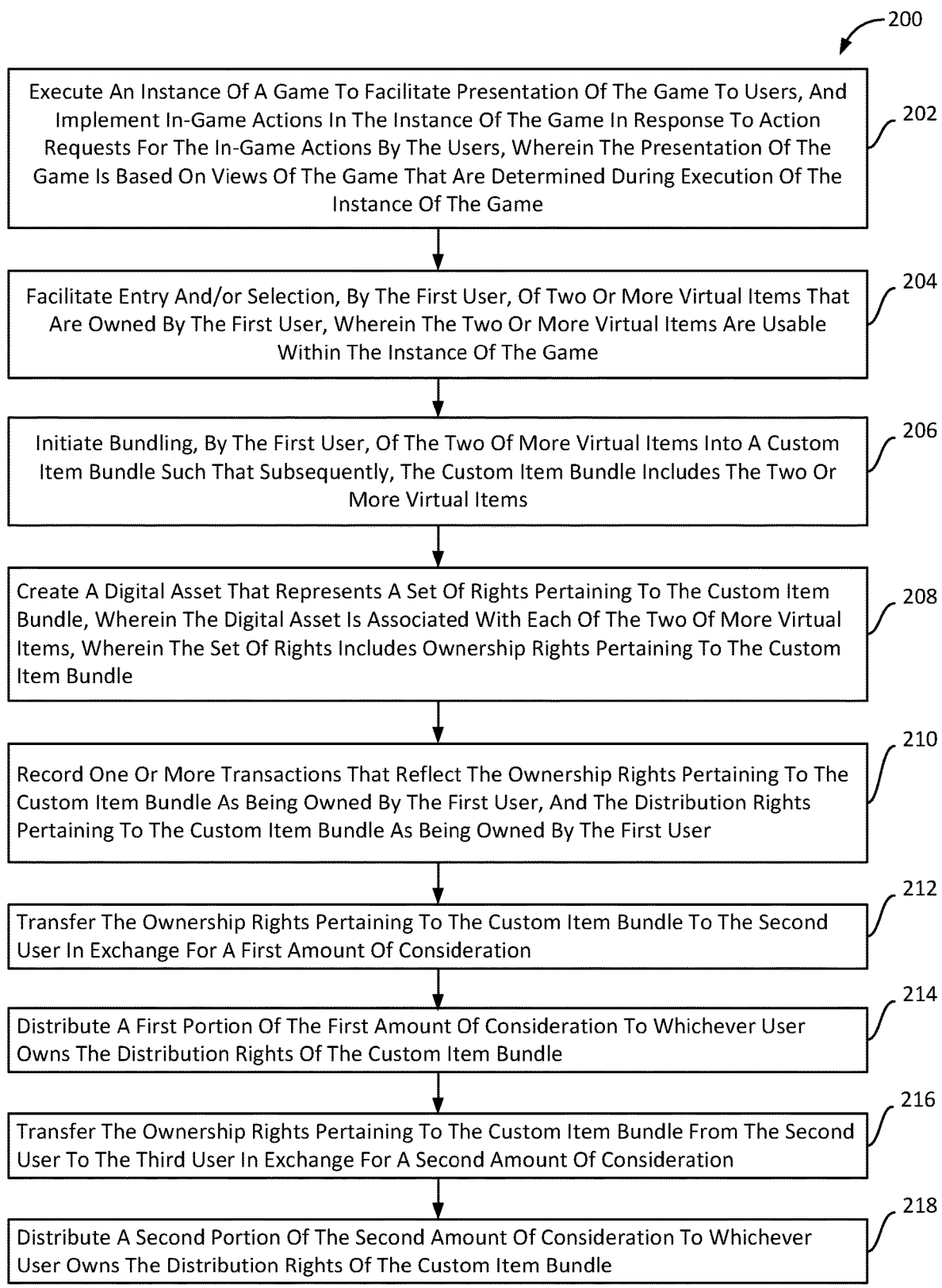
FIG. 2 illustrates a method to support custom bundling of virtual items within an online gaming platform, in accordance with one or more implementations.

FIG. 2 illustrates a method 200 to support custom bundling of virtual items within an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed within the online gaming platform to facilitate presentation of the game to users, and in-game actions are implemented in the instance of the game in response to action requests for the in-game actions by the users. The presentation of the game is based on views of the game that are determined during execution of the instance of the game. The users include a first user, a second user, and a third user that interact with the instance of the game. In some embodiments, operation 202 is performed by one or both of a game component and an interaction component the same as or similar to game component 108 and interaction component 110 (shown in FIG. 1 and described herein).

At an operation 204, entry and/or selection is facilitated, by the first user, of two or more virtual items that are owned by the first user. The two or more virtual items are usable within the instance of the game. In some embodiments, operation 204 is performed by an interface component the same as or similar to interface component 112 (shown in FIG. 1 and described herein).

At an operation 206, bundling is initiated, by the first user, of the two of more virtual items into a custom item bundle such that subsequently, the custom item bundle includes the two or more virtual items. In some embodiments, operation 206 is performed by an interface component the same as or similar to interface component 112 (shown in FIG. 1 and described herein).

At an operation 208, responsive to the bundling of the two or more virtual items into the custom item bundle, a digital asset is created that represents a set of rights pertaining to the custom item bundle. The digital asset is associated with each of the two of more virtual items. The set of rights includes ownership rights pertaining to the custom item bundle, and distribution rights pertaining to the custom item bundle. In some embodiments, operation 208 is performed by a bundling component the same as or similar to bundling component 114 (shown in FIG. 1 and described herein).

At an operation 210, one or more transactions are recorded on a decentralized ledger implemented by a decentralized ledger server. The one or more transactions reflect the ownership rights pertaining to the custom item bundle as being owned by the first user, and the distribution rights pertaining to the custom item bundle as being owned by the first user. In some embodiments, operation 210 is performed by a transaction component the same as or similar to transaction component 116 (shown in FIG. 1 and described herein).

At an operation 212, the ownership rights pertaining to the custom item bundle are transferred to the second user in exchange for a first amount of consideration. In some embodiments, operation 212 is performed by a transfer component the same as or similar to transfer component 118 (shown in FIG. 1 and described herein).

At an operation 214, a first portion of the first amount of consideration is distributed to whichever user owns the distribution rights of the custom item bundle. In some embodiments, operation 214 is performed by a distribution component the same as or similar to distribution component 120 (shown in FIG. 1 and described herein).

At an operation 216, the ownership rights pertaining to the custom item bundle are transferred from the second user to the third user in exchange for a second amount of consideration. In some embodiments, operation 216 is performed by a transfer component the same as or similar to transfer component 118 (shown in FIG. 1 and described herein).

At an operation 218, a second portion of the second amount of consideration is distributed to whichever user owns the distribution rights of the custom item bundle. In some embodiments, operation 218 is performed by a distribution component the same as or similar to distribution component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured for supporting custom bundling of virtual items within an online gaming platform, the system comprising:
   one or more processors configured by machine-readable instructions to:

execute, within the online gaming platform, an instance of a game to facilitate presentation of the game to users, and implement in-game actions in the instance of the game in response to action requests for the in-game actions by the users, wherein presentation of the game is based on views of the game that are determined during execution of the instance of the game, wherein the users include a first user, a second user, and a third user;

facilitate entry and/or selection, by the first user, of two or more virtual items that are owned by the first user, wherein the two or more virtual items are usable within the instance of the game;

initiate bundling, by the first user, of the two or more virtual items into a custom item bundle such that the custom item bundle includes the two or more virtual items;

subsequent to the bundling of the two or more virtual items into the custom item bundle, create a digital asset that represents a set of rights pertaining to the custom item bundle, wherein the digital asset is associated with each of the two of more virtual items, wherein the set of rights includes ownership rights pertaining to the custom item bundle;

record, on a decentralized ledger implemented by a decentralized ledger server, one or more transactions that reflect the ownership rights pertaining to the custom item bundle as being owned by the first user;

subsequent to recordation of the ownership rights pertaining to the custom item bundle as being owned by the first user, unlock value for the first user within the instance of the game;

transfer the ownership rights pertaining to the custom item bundle to the second user;

responsive to recordation of the ownership rights pertaining to the custom item bundle as being owned by the second user,
(i) remove the value for the first user within the instance of the game such that the first user no longer has the value that was previously unlocked, and
(ii) unlock the value for the second user within the instance of the game;

transfer the ownership rights pertaining to the custom item bundle from the second user to the third user in exchange for an amount of consideration;

responsive to recordation of the ownership rights pertaining to the custom item bundle as being owned by the third user,
(i) remove the value for the second user within the instance of the game such that the second user no longer has the value that was previously unlocked, and
(ii) unlock the value for the third user within the instance of the game; and distribute a portion of the amount of consideration to whichever user owns distribution rights of the custom item bundle.

2. The system of claim 1, wherein the one or more processors are configured to facilitate the entry and/or the selection through presentation of a bundling interface, wherein the bundling interface is presented to the first user on a first client computing platform that is associated with the first user.

3. The system of claim 2, wherein the entry and/or the selection of the two or more virtual items includes moving the two or more virtual items into a particular field of the bundling interface.

4. The system of claim 2, wherein initiation of the bundling is accomplished by the first user through use of a graphical user interface element in the bundling interface.

5. The system of claim 1, wherein transferring the ownership rights pertaining to the custom item bundle from the first user to the second user effectuates a transfer of the two of more virtual items included in the custom item bundle from the first user to the second user.

6. The system claim 1, wherein the one or more processors are further configured by the machine-readable instructions to:
generate a set of instructions to form the digital asset as a smart contract;
transfer the set of instructions to the decentralized ledger server;
wherein the system further comprises:
the decentralized ledger server comprising one or more processors configured by machine-readable instructions to:
receive and execute the set of instructions to record the digital asset on the decentralized ledger as the smart contract.

7. The system of claim 6, wherein distribution of the portion of the amount of consideration is accomplished by recording a transaction on the decentralized ledger, wherein the transaction invokes a function of the smart contract such that execution of the function transfers the portion of the amount of consideration to a blockchain address that is associated with whichever user owns the distribution rights of the custom item bundle.

8. The system of claim 1, wherein transferring the ownership rights pertaining to the custom item bundle to the second user is performed in exchange for a first amount of consideration.

9. The system of claim 1, wherein the value is at least one of a reward that is usable within the instance of the game, a status identifier that is visible to other users within the instance of the game, and a skill that is usable within the instance of the game.

10. The system of claim 1, wherein the value represents progress of a level of the first user within the instance of the game.

11. A method to support custom bundling of virtual items within an online gaming platform, the method comprising:
executing, within the online gaming platform, an instance of a game to facilitate presentation of the game to users, and implementing in-game actions in the instance of the game in response to action requests for the in-game actions by the users, wherein the presentation of the game is based on views of the game that are determined during execution of the instance of the game, wherein the users include a first user, a second user, and a third user;

facilitating entry and/or selection, by the first user, of two or more virtual items that are owned by the first user, wherein the two or more virtual items are usable within the instance of the game;

initiating bundling, by the first user, of the two of more virtual items into a custom item bundle such that the custom item bundle includes the two or more virtual items;

subsequent to the bundling of the two or more virtual items into the custom item bundle, creating a digital asset that represents a set of rights pertaining to the custom item bundle, wherein the digital asset is associated with each of the two of more virtual items, wherein the set of rights includes ownership rights pertaining to the custom item bundle;

recording, on a decentralized ledger implemented by a decentralized ledger server, one or more transactions that reflect the ownership rights pertaining to the custom item bundle as being owned by the first user;

subsequent to recordation of the ownership rights pertaining to the custom item bundle as being owned by the first user, unlocking value for the first user within the instance of the game;

transferring the ownership rights pertaining to the custom item bundle to the second user;

responsive to recordation of the ownership rights pertaining to the custom item bundle as being owned by the second user,
- (i) removing the value for the first user within the instance of the game such that the first user no longer has the value that was previously unlocked, and
- (ii) unlocking the value for the second user within the instance of the game;

transferring the ownership rights pertaining to the custom item bundle from the second user to the third user in exchange for an amount of consideration;

responsive to recordation of the ownership rights pertaining to the custom item bundle as being owned by the third user,
- (i) removing the value for the second user within the instance of the game such that the second user no longer has the value that was previously unlocked, and
- (ii) unlocking the value for the third user within the instance of the game; and distributing a portion of the amount of consideration to whichever user owns distribution rights of the custom item bundle.

12. The method of claim 11, wherein facilitating the entry and/or the selection includes presenting a bundling interface, wherein the bundling interface is presented to the first user on a first client computing platform that is associated with the first user.

13. The method of claim 12, wherein facilitating the entry and/or the selection of the two or more virtual items includes the first user moving the two or more virtual items into a particular field of the bundling interface.

14. The method of claim 12, wherein initiating the bundling is accomplished by the first user through use of a graphical user interface element in the bundling interface.

15. The method claim 14, wherein transferring the ownership rights pertaining to the custom item bundle from the first user to the second user includes transferring the two of more virtual items included in the custom item bundle from the first user to the second user.

16. The method of claim 11, further comprising:
generating a set of instructions to form the digital asset as a smart contract;
transferring the set of instructions to the decentralized ledger server; and
receiving and executing the set of instructions to record the digital asset on the decentralized ledger as the smart contract.

17. The method of claim 16, wherein distributing the portion of the amount of consideration includes recording a transaction on the decentralized ledger, wherein the transaction invokes a function of the smart contract such that execution of the function transfers the portion of the amount of consideration to a blockchain address that is associated with whichever user owns the distribution rights of the custom item bundle.

18. The method of claim 11, wherein transferring the ownership rights pertaining to the custom item bundle to the second user is performed in exchange for a first amount of consideration.

19. The method of claim 11, wherein the value is at least one of a reward that is usable within the instance of the game, a status identifier that is visible to other users within the instance of the game, and a skill that is usable within the instance of the game.

20. The method of claim 11, wherein the value represents progress of a level of the first user within the instance of the game.

* * * * *